United States Patent
Bardman et al.

(10) Patent No.: US 11,186,741 B2
(45) Date of Patent: Nov. 30, 2021

(54) AQUEOUS DISPERSION OF MULTISTAGE POLYMER PARTICLES

(71) Applicant: Rohm and Haas Company, Collegeville, PA (US)

(72) Inventors: James K. Bardman, Green Lane, PA (US); David G. Kelly, Ambler, PA (US); Michael W. Leonard, Collegeville, PA (US)

(73) Assignee: Rohm and Haas Company, Collegeville, PA (US)

( * ) Notice: Subject to any disclaimer, the term of this patent is extended or adjusted under 35 U.S.C. 154(b) by 342 days.

(21) Appl. No.: 16/556,572

(22) Filed: Aug. 30, 2019

(65) Prior Publication Data

US 2020/0071558 A1 Mar. 5, 2020

Related U.S. Application Data

(60) Provisional application No. 62/726,628, filed on Sep. 4, 2018.

(51) Int. Cl.
*C09D 133/06* (2006.01)
*C09D 7/40* (2018.01)

(52) U.S. Cl.
CPC ........... *C09D 133/064* (2013.01); *C09D 7/70* (2018.01)

(58) Field of Classification Search
CPC .............................. C09D 133/064; C09D 7/70
USPC ....................................................... 523/201
See application file for complete search history.

(56) References Cited

U.S. PATENT DOCUMENTS

| | | | | |
|---|---|---|---|---|
| 5,403,894 A | * | 4/1995 | Tsai | C08F 265/06 525/285 |
| 5,639,805 A | * | 6/1997 | Park | C08F 265/06 523/201 |
| 6,020,435 A | * | 2/2000 | Blankenship | C08F 291/00 525/256 |
| 6,252,004 B1 | * | 6/2001 | Blankenship | C08F 291/00 525/244 |
| 7,776,975 B2 | * | 8/2010 | Blankenship | C08F 291/00 526/82 |
| 8,445,559 B2 | | 5/2013 | Bardman | |
| 10,377,914 B2 | * | 8/2019 | Kehrloesser | C09D 7/42 |
| 10,597,477 B2 | * | 3/2020 | Balk | C08F 2/26 |
| 2005/0014883 A1 | * | 1/2005 | Blankenship | C08F 265/06 524/458 |
| 2012/0129965 A1 | * | 5/2012 | Tuchbreiter | C08F 220/1804 521/139 |
| 2016/0208128 A1 | * | 7/2016 | Kehrloesser | C09D 125/14 |
| 2017/0275407 A1 | * | 9/2017 | Balk | C08F 265/06 |
| 2017/0321059 A1 | * | 11/2017 | Yang | C08F 230/02 |

OTHER PUBLICATIONS

Search report from corresponding European 19195251.4 application, dated Jan. 24, 2020.

* cited by examiner

*Primary Examiner* — Michael M. Bernshteyn
(74) *Attorney, Agent, or Firm* — Reid S. Willis

(57) ABSTRACT

The present invention relates to a composition comprising an aqueous dispersion of multistage polymer particles comprising a first and a second phase, wherein the first phase comprises structural units of a carboxylic acid monomer or a salt thereof, and a nonionic ethylenically unsaturated monomer; and wherein the second phase comprises a first and second polymer, wherein the first phase or the second phase first polymer or both comprise structural units of a high $T_g$ hydrophobic monomer; and wherein the second phase second polymer comprises at least 80 percent structural units of styrene. The high $T_g$ hydrophobic monomer is defined as being one or more of the following monomers: cyclohexyl methacrylate, isobornyl methacrylate, 4-t-butyl methacrylate, t-butylstyrene, or n-butyl methacrylate. The multistage polymer particles are useful as opaque polymers, which are used in pigmented coating formulations to reduce the load of $TiO_2$. The particles exhibit excellent collapse resistance and unusually low dry bulk density, and do not require acrylonitrile to achieve this desired combination of properties.

9 Claims, No Drawings

AQUEOUS DISPERSION OF MULTISTAGE POLYMER PARTICLES

BACKGROUND OF THE INVENTION

The present invention relates to an aqueous dispersion of multistage polymer particles that is useful for improving hiding efficiency in a pigmented coatings formulation.

Titanium dioxide ($TiO_2$) is the opacifying pigment of choice for use in paint formulations due to its exceptionally high refractive index; however, the high cost of $TiO_2$ has motivated researchers to investigate ways to reduce its loading while maintaining high opacifying (hiding) efficiency. One such approach has been the development and commercialization of high scattering polymeric pigments known as opaque polymers, which have been found to preserve hiding efficiency at a lower pigment volume concentration (PVC) $TiO_2$. U.S. Pat. No. 6,020,435 discloses the preparation of an aqueous dispersion of core-shell polymer particles containing acid-functionalized cores, which are converted to opaque polymers upon neutralization of the core and subsequently coating a substrate with the dispersion, thereby allowing water to evaporate to form a film with voided particles.

The efficiency improvement from opaque polymers arises primarily from two factors: Low dry bulk density and collapse resistance; unfortunately, efforts to achieve lower dry bulk density to achieve further improvements in hiding efficiency reduces resistance to collapse. This correlation is unsurprising because low dry bulk densities correlate with a larger core, therefore a larger weight-to-weight core-to-shell ratio at the desired particle size; the result is a thinner shell that is more susceptible to collapse. It has been found that acrylonitrile incorporation into an intermediate or post-intermediate polymerization stage—the stage or stages following the core stage—results in the formation of opaque polymers with lower dry bulk density and at an acceptable collapse resistance; nevertheless, acrylonitrile is acutely toxic and has been observed to cause mucous membrane irritation, headaches, dizziness, and nausea to exposed workers. Therefore, it would be advantageous to prepare collapse resistant low dry bulk density polymer particles without acrylonitrile functionalization.

SUMMARY OF THE INVENTION

The present invention addresses a need in the art by providing a composition comprising an aqueous dispersion of multistage polymer particles comprising a first and a second phase, wherein:

a) the first phase comprises, based on the weight of the first phase, from 25 to 60 weight percent structural units of a carboxylic acid monomer or a salt thereof, from 40 to 75 weight percent structural units of a nonionic ethylenically unsaturated monomer, and up to a total of 15 weight percent structural units of styrene and a high $T_g$ hydrophobic monomer; and wherein b) the second phase comprises a mixture of first and second polymers, wherein 1) the first polymer comprises, based on the weight of the first polymer, i) from 5 to 15 weight percent structural units of a carboxylic acid monomer or a salt thereof; ii) from 45 to 55 weight percent structural units of styrene; and iii) from 37 to 47 weight percent structural units of methyl methacrylate or the high $T_g$ hydrophobic monomer or a combination thereof; and 2) the second polymer comprises, based on the weight of the second polymer, i) from 80 to 99.9 weight percent structural units of styrene; and ii) from 0.1 to 0.5 weight percent structural units of a multiethylenically unsaturated monomer;

wherein the weight-to-weight ratio of the first phase to the second phase is in the range of from 1:9 to 1:20; and wherein the weight-to-weight ratio of the first polymer of the second phase to the second polymer of the second phase is in the range of from 1:3 to 1:8;

with the proviso that the first phase and the first polymer of the second phase together comprise, based on the weight of the first phase and the first polymer of the second phase, from 2 to 15 weight percent structural units of the high $T_g$ hydrophobic monomer, which is one or more monomers selected from the group consisting of cyclohexyl methacrylate, isobornyl methacrylate, 4-t-butyl methacrylate, t-butylstyrene, and n-butyl methacrylate.

DETAILED DESCRIPTION OF THE INVENTION

The present invention is a composition comprising an aqueous dispersion of multistage polymer particles comprising a first and a second phase, wherein:

a) the first phase comprises, based on the weight of the first phase, from 25 to 60 weight percent structural units of a carboxylic acid monomer or a salt thereof, from 40 to 75 weight percent structural units of a nonionic ethylenically unsaturated monomer, and up to a total of 15 weight percent structural units of styrene and a high $T_g$ hydrophobic monomer; and wherein b) the second phase comprises a mixture of first and second polymers, wherein 1) the first polymer comprises, based on the weight of the first polymer, i) from 5 to 15 weight percent structural units of a carboxylic acid monomer or a salt thereof; ii) from 45 to 55 weight percent structural units of styrene; and iii) from 37 to 47 weight percent structural units of methyl methacrylate or the high $T_g$ hydrophobic monomer or a combination thereof; and 2) the second polymer comprises, based on the weight of the second polymer, i) from 80 to 99.9 weight percent structural units of styrene; and ii) from 0.1 to 0.5 weight percent structural units of a multiethylenically unsaturated monomer;

wherein the weight-to-weight ratio of the first phase to the second phase is in the range of from 1:9 to 1:20; and wherein the weight-to-weight ratio of the first polymer of the second phase to the second polymer of the second phase is in the range of from 1:3 to 1:8;

with the proviso that the first phase and the first polymer of the second phase together comprise, based on the weight of the first phase and the first polymer of the second phase, from 2 to 15 weight percent structural units of the high $T_g$ hydrophobic monomer, which is one or more monomers selected from the group consisting of cyclohexyl methacrylate, isobornyl methacrylate, 4-t-butyl methacrylate, t-butylstyrene, and n-butyl methacrylate.

The multistage polymer particles of the present invention preferably have a core-shell morphology wherein the first phase corresponds to the core and the second phase corresponds to the shell. The core may be produced by a single stage or a multistage process, preferably in the presence of a chain transfer agent such as n-dodecyl mercaptan or mercaptoethanol. The core may also be prepared from a seed process. A preferred method of preparing the core is described in U.S. Pat. No. 6,020,435.

Preferably, the first phase comprises from 30, more preferably from 35, and most preferably from 38 weight percent, to preferably 50, more preferably to 45, and most preferably to 42 weight percent structural units of a salt of a carboxylic acid monomer, based on the weight of the first phase. As used herein, the term "structural units" refers to the remnant of the recited monomer after polymerization. For example, a structural unit of a salt of methacrylic acid, where M⁺ is a counterion, preferably a lithium, sodium, or potassium counterion, is as illustrated:

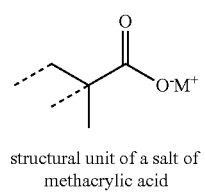

structural unit of a salt of
methacrylic acid

The first phase also preferably comprises from 50, more preferably from 55, and most preferably from 58 weight percent, to preferably 70, more preferably to 65, and most preferably to 62 weight percent structural units of a nonionic ethylenically unsaturated monomer.

The first phase preferably comprises from 5 to 10 weight percent total structural units of styrene and/or a high $T_g$ hydrophobic monomer selected from the group consisting of cyclohexyl methacrylate, isobornyl methacrylate, 4-t-butyl methacrylate, t-butylstyrene, and n-butyl methacrylate. The term "high $T_g$ monomer" refers to a monomer that forms a homopolymer that is not film-forming at 25° C. In one preferred embodiment, the first phase comprises from 5, more preferably from 6 weight percent to 10 weight percent structural units of the high $T_g$ hydrophobic monomer, based on the weight of the first phase. In another embodiment, the first phase comprises, based on the weight of the first phase, less than 10, more preferably less than 5, and most preferably less than 1 weight percent structural units of styrene.

Examples of carboxylic acid functionalized monomers include methacrylic acid, acrylic acid, and itaconic acid, with acrylic acid and methacrylic acid being preferred. Examples of nonionic ethylenically unsaturated monomers include $C_1$-$C_{10}$ alkyl acrylates and methacrylates such as methyl methacrylate, ethyl acrylate, ethyl methacrylate, butyl acrylate, butyl methacrylate, and 2-ethylhexyl acrylate; and styrene. Methyl methacrylate and butyl methacrylate are preferred nonionic ethylenically unsaturated monomers used to prepare the first phase.

The average particle size of the first phase is preferably in the range of from 80 nm to 150 nm as measured by light scattering using a BI-90 Plus Brookhaven Particle Analyzer.

The second phase first polymer preferably comprises from 6, more preferably from 7 weight percent, to 12, more preferably to 9 weight percent structural units of a salt of a carboxylic acid monomer, preferably an alkali metal salt of methacrylic acid of acrylic acid. The second phase second polymer preferably comprises from 83 to 91 weight percent structural units of styrene; preferably from 8 to 12 weight percent structural units of methyl methacrylate; preferably from 0.5 to 4 weight percent structural units of a salt of a carboxylic acid monomer, preferably an alkali metal salt of methacrylic acid or acrylic acid; and preferably from 0.1 to 0.4 weight percent structural units of a multiethylenically unsaturated monomer such as divinyl benzene or allyl methacrylate. In another embodiment, the second phase first polymer comprises from 5 to 15 weight percent structural units of the high $T_g$ hydrophobic monomer, based on the weight of the second phase first polymer. In another embodiment, the second phase first polymer comprises, based on the weight of the second phase first polymer, less than 10, more preferably less than 5, and most preferably less than 1 weight percent structural units of styrene.

The weight-to-weight ratio of the first phase to the second phase is preferably in the range of from 1:11, more preferably from 1:12, to 1:18, and more preferably to 1:16; and the weight-to-weight ratio of the first polymer of the second phase to the second polymer of the second phase is preferably in the range of from 1:4, more preferably from 1:5, to preferably 1:7.

The multistage polymer particles are preferably prepared in three stages from the aqueous dispersion of the first phase polymer particles. In a preferred method of preparing the aqueous dispersion of multistage polymer particles, a first monomer emulsion (ME 1) comprising methacrylic acid, methyl methacrylate, and styrene are contacted in a kettle with an aqueous dispersion of first phase (core) polymer particles having a solids content in the range of from 20, more preferably from 25, to 40, more preferably to 35 weight percent, and copolymerized under emulsion polymerization conditions to form a dispersion of core/tie-layer polymer particles. In one embodiment, the core polymer particles comprise from 5, more preferably from 6 weight percent, to 15, and more preferably to 10 weight percent structural units of the hydrophobic high $T_g$ monomer. ME 1 preferably comprises from 6, more preferably from 7 weight percent, to 12, and more preferably to 9 weight percent of methacrylic acid or acrylic acid based on the weight of ME 1 monomers; preferably from 48 to 52 weight percent styrene based on the weight of ME 1 monomers; and preferably from 20 to 40 weight percent methyl methacrylate, based on the weight of ME 1 monomers. In one embodiment, ME 1 comprises 0 weight percent of the hydrophobic high $T_g$ monomer; in another embodiment, ME 1 comprises from 2, and more preferably from 4 weight percent, to 12, and more preferably to 10 weight percent of the hydrophobic high $T_g$ monomer based on the weight of ME 1 monomers. The core polymer particles or the tie-layer or both comprise structural units of a high $T_g$ hydrophobic monomer. The weight-to-weight ratio of ME 1 to core is in preferably the range of from 0.5:1, more preferably from 1:1, to 4:1, and more preferably to 3:1.

The second phase second polymer may be prepared in a single stage but is advantageously prepared in two stages (designated as ME 2 and ME 3) as follows: Upon completion of addition of ME 1 to the kettle, a second monomer emulsion (ME 2) comprising from 78 to 86.5 weight percent styrene, from 12 to 18.5 weight percent methyl methacrylate, from 1 to 4 weight percent methacrylic acid or acrylic acid, and from 0.1 weight percent to 0.6 weight percent allyl methacrylate of divinyl benzene is added to the kettle under emulsion polymerization conditions. ME 2 also preferably includes from 0.2 to 0.8 weight percent of linseed oil fatty acid. The weight-to-weight ratio of ME 2 to ME 1 is preferably in the range of from 3.5:1, more preferably from 4:1, and most preferably from 4.5:1, to 6:1, more preferably to 5.5:1, and most preferably to 5:1.

After a suitable hold period of ~15 minutes, a third monomer emulsion (ME 3), which contains styrene and 4-hydroxy TEMPO, is fed into the reactor followed by addition of hot deionized water and a neutralizing amount of a base such as NH$_4$OH or an alkali metal hydroxide such as concentrated NaOH. The dispersion is advantageously chased with t-butyl hydroperoxide (t-BHP) and isoascorbic acid (IAA) and the contents were filtered to remove any coagulum. The weight-to-weight ratio of ME 3 to ME 2 is preferably in the range of from 0.1:1, more preferably from 0.15:1 to 0.5:1, more preferably to 0.3:1, and most preferably to 0.25:1.

Accordingly, in another aspect of the present invention, the second phase second polymer is a mixture of polymers, one of which (second phase second polymer A) comprises, based on the weight of the second phase second polymer A, from 78 to 86.5 weight percent structural units of styrene, from 12 to 18.5 weight percent structural units of methyl methacrylate, from 1 to 4 weight percent structural units of methacrylic acid or acrylic acid, and from 0.1 weight percent to 0.6 weight percent structural units of a multiethylenically unsaturated monomer; and a second of which (second phase second polymer B) comprises, based on the weight of second phase second polymer B, preferably at least 98 weight percent, preferably 100 weight percent structural units of styrene, wherein the weight-to-weight ratio of second phase second polymer A to second phase second polymer B is in the range of from 3:0:1, more preferably from 3.5:1, more preferably from 4:1, and most preferably from 4.5:1, to 6:1, more preferably to 5.5:1, and most preferably to 5:1.

Preferably, the average particle size of the neutralized multistage polymer particles as measured by light scattering using a BI-90 Plus Brookhaven Particle Analyzer is in the range of from 150 nm, more preferably from 200 nm, most preferably from 350 nm; to 600 nm, more preferably to 500 nm, most preferably to 450 nm. The solids content of the aqueous dispersion of multistage polymer particles is preferably in the range of from 10 to 35 weight percent.

The aqueous dispersion of multistage polymer particles is useful as an opacifying polymeric additive that allows for the reduced loading of TiO$_2$ in paint formulations. When formulations containing these opacifying polymer additives are applied as a coating to a substrate and allowed to dry, collapse resistant opaque polymers with a dry bulk density in the range of 0.50 to 0.55 g/cc were formed. Collapse resistant opaque polymers with dry bulk densities at this low a level have until now only been achieved with inclusion of acrylonitrile in the second phase; however, it has been surprisingly discovered that acrylonitrile, as well as methacrylonitrile, acrylamide, and methacrylamide, are no longer necessary to achieve the properties heretofore only achievable with the inclusion of these difficult to handle monomers. Accordingly, the second phase of the multistage polymer particles preferably comprises less than 10 weight percent, more preferably less than 1 weight percent, more preferably less than 0.1 weight percent, and most preferably 0 structural units of acrylonitrile, methacrylonitrile, acrylamide, and methacrylamide, based on the weight of the second phase.

The aqueous dispersion of multistage polymer particles of the present invention is useful as a supplementary opacifying pigment in paint formulations. In another aspect, the present invention is a pigmented water-based coatings composition comprising a dispersion of the multistage polymer particles, a rheology modifier, a binder, TiO$_2$, and at least one additive selected from the groups consisting of surfactants, defoamers, biocides, dispersants, coalescents, and neutralizing agents.

S/Mil Measurements

Kubelka-Munk Scattering Coefficient (S/Mil)

The scattering coefficient (S/Mil) is a measure of the opacity of the aqueous dispersion of multistage polymer particles. A sample of the dispersion was blended with RHOPLEX™ AC-264 Emulsion Polymer (AC-264, A Trademark of The Dow Chemical Company or Its Affiliates) on a solids basis at a weight-to-weight ratio of 15% aqueous dispersion/85% AC-264. A 7-mil wet film of the blend is drawn over a sheet of black vinyl that was measured for thickness in four small defined areas with an Ames Gauge. The film was dried for 2 h at low relative humidity (<40% R.H.). The reflectance of the dry film was measured by a Gardner Instrument Reflectometer over the four defined areas. The thickness of the dried film was also determined over the same defined areas using the Ames Gauge. The Scattering coefficient was calculated for each of defined areas as:

$$S/Mil = \frac{R}{(1-R) \times T}$$

$R$ = Reflectance $T$ = film thickness in mils

The four S/Mil measurements were then averaged to obtain the S/Mil for the film.

Collapse

Collapse is an indication of the ability of disperse multistage polymer particles to resist the forces of drying acting on the walls of the internal microvoid. These forces are at their greatest when the humidity is high, which causes the particles to dry slowly. Collapse is determined using essentially the same procedure that is used in determining S/Mil above except that a second drawdown is dried overnight at 85% R.H., then dried at <40% R.H. for 1 h.

$$\% \text{ Collapse} = 1 - \left(\frac{\text{High humidity S/mil}}{\text{Low humidity S/mil}}\right) \times 100$$

EXAMPLES

The preparation of the aqueous dispersion of the core was carried out as described in U.S. Pat. No. 6,020,435. Table 1 illustrates the monomers and relative amounts used to prepare the aqueous dispersions of the cores, as well as the solids content and average particle size of the core particles, as measured by a Brookhaven BI 90 particle size analyzer. MMA refers to methyl methacrylate; MAA refers to methacrylic acid; CHMA refers to cyclohexyl methacrylate; t-BuSty refers to t-butylstyrene; Sty refers to styrene; t-BuMA refers to t-butyl methacrylate; t-BuMA refers to t-butyl methacrylate.

Also, the term tie-coat is used to describe the polymers formed from monomers in ME 1.

TABLE 1

Monomer Distribution, Particle Size, and Solids Content of Cores

| Intermediate Ex # | Monomer Distribution | Particle Size | % Solids |
|---|---|---|---|
| 1 | 66 MMA/34 MAA | 140 nm | 32.1% |
| 2 | 62 MMA/34 MAA/4 CHMA | 140 nm | 32.1% |
| 3 | 58 MMA/34 MAA/8 CHMA | 138 nm | 32.1% |
| 4 | 56 MMA/34 MAA/10 t-BuSty | 141 nm | 32.4% |
| 5 | 56 MMA/10 Sty/34 MAA | 135 nm | 31.9% |
| 6 | 56 MMA/10 t-BuMA/34 MAA | 140 nm | 31.6% |
| 7 | 55 MMA/10 BMA/35 MAA | 140 nm | 31.7% |
| 8 | 56 MMA/8 IBOMA/34 MAA | 140 nm | 31.7% |

Comparative Example 1—Preparation of Aqueous Dispersion of Polymer Particles with No Hydrophobic High $T_g$ Monomer in Core or ME 1

Deionized water (800 g) was added to a 5-L 4-necked round bottom flask (kettle) equipped with a paddle stirrer, thermometer, nitrogen inlet, and reflux condenser; the kettle was heated to 89° C. under $N_2$ at which time sodium persulfate (3.2 g) dissolved deionized water (30 g) was added, followed immediately the addition the core of Intermediate Example 1 (186.9 g). A monomer emulsion (ME 1), which was prepared by mixing deionized water (60.0 g), sodium dodecyl sulfate (SDS, 4.0 g, 23% active), styrene (60.0 g), MMA (50.4 g), and MAA (9.6 g) was added to the kettle at a rate of 3.0 g/min at a temperature of 77-79° C. Upon completion of ME 1 addition, a second monomer emulsion (ME 2), which was prepared by mixing deionized water (187.0 g), SDS (8.0 g, 23% active), styrene (491.4 g), MMA (72.0 g), MAA (10.8 g), linseed oil fatty acid (LOFA 3.6 g), and allyl methacrylate (ALMA 1.80 g), was fed to the reactor at a rate of 10 g/m for 15 min during which time the temperature was allowed to rise to 84° C. After 15 min, the feed rate of ME 2 was increased to 20 g/min and a separate mixture of sodium persulfate (0.75 g) dissolved in deionized water (62.0 g) was co-fed to the reactor at a rate of 1.5 g/min. The temperature of the reaction mixture was allowed to increase to 92-93° C. during the course of the ME 2 feed. Upon completion of addition of ME 2 and the co-feed, a mixture of 0.1% $FeSO4.7H_2O$ (20.0 g)/1% VERSENE™ Chelating Agent (2.0 g, A Trademark of The Dow Chemical Company or its Affiliates) was added to the kettle; the temperature was held for 15 min at ~92° C., after which time a third monomer emulsion (ME 3), which was prepared by mixing deionized water (46 g), SDS (1.7 g), styrene (144.0 g), and 4-hydroxy-2,2,6,6-tetramethylpiperidin-1-oxyl(4-hydroxy TEMPO, 3.0 g), was fed to the kettle at a rate of 40 g/min. After completion of ME 3 addition, hot deionized water (300 g) was added to the kettle followed by addition of a mixture of 50% sodium hydroxide (26.6 g) and hot water (450 g) over 10 min. The reaction mixture was then held for 5 min at a temperature of 80-85° C., after which time a mixture of t-BHP (1.2 g) and deionized water (25 g) was added to the kettle. A mixture of isoascorbic acid (IAA, 0.65 g) and deionized water (50 g) was then fed to the kettle over 25 min. Upon completion of the IAA co-feed, the kettle was cooled to room temperature and the contents filtered to remove any coagulum formed. The final latex had a solids content of 28.5%, a pH of 8.6, and a particle size of 427 nm. The dry density of this polymer was calculated to be 0.517 g/mL. Low RH S/Mil was 1.34, High RH S/Mil was 0.97, and % Collapse was 28%.

Example 1—Preparation of Aqueous Dispersion of Polymer Particles with CHMA in ME 1

The procedure of Comparative Example 1 was carried out except that Intermediate Example 1 core (188.1 g) was used; and ME 1 monomers were styrene (60.0 g), MMA (44.4 g), MAA (9.6 g), and CHMA (6.0 g). The final latex had a solids content of 28.5%, a pH of 8.9, and a particle size of 384 nm. The dry density of this polymer was calculated to be 0.533 g/cc. Low RH S/Mil was 1.31, High RH S/Mil was 1.23, and % Collapse was 6%.

Example 2—Preparation of Aqueous Dispersion of Polymer Particles with CHMA in ME 1

The procedure of Comparative Example 1 was followed except that Intermediate Example 1 core (188.7 g) was used; and ME 1 monomers were styrene (60.0 g), MMA (26.4 g), MAA (9.6 g), and CHMA (24.0 g). The final latex had a solids content of 28.8%, a pH of 8.9, and a particle size of 415 nm. The dry density of this polymer was calculated to be 0.541 g/cc. Low RH S/Mil was 1.28, High RH S/Mil was 1.22, and % Collapse was 5%.

Example 3—Preparation of Aqueous Dispersion of Polymer Particles with CHMA in the Core The procedure of Comparative Example 1 was carried out except that Intermediate Example 3 core (186.9 g) was used; and ME 1 monomers were styrene (60.0 g), MMA (26.4 g), MAA (9.6 g), and CHMA (12.0 g). The final latex had a solids content of 28.2%, a pH of 8.9, and a particle size of 412 nm. The dry density of this polymer was calculated to be 0.541 g/cc. Low RH S/Mil was 1.32, High RH S/Mil was 1.32, and % Collapse was 0%.

Example 4—Preparation of Aqueous Dispersion of Polymer Particles with t-Butyl Styrene in the Core The procedure of Comparative Example 1 was followed except that the core (185.2 g) was made as described in Intermediate Example 4. The final latex had a solids content of 28.4%, a pH of 8.75, and a particle size of 409 nm. The dry density of this polymer was calculated to be 0.541 g/cc. Low RH S/Mil was 1.40, High RH S/Mil was 1.28, and % Collapse was 8.5%.

Example 5—Preparation of Aqueous Dispersion of Polymer Particles with t-Butyl Styrene in the Core and Tiecoat The procedure of Comparative Example 1 was carried except that Intermediate Example 4 core (185.2 g) was used; and ME 1 monomers were styrene (60.0 g), MMA (44.4 g), MAA (9.6 g), t-BuSty (6.4 g). The final latex had a solids content of 28.4%, a pH of 8.85, and a particle size of 403 nm. The dry density of this polymer was calculated to be 0.543 g/cc. Low RH S/Mil was 1.40, High RH S/Mil was 1.33, and % Collapse was 5%.

Comparative Example 2—Preparation of Aqueous Dispersion of Polymer Particles with Styrene in the Core The procedure of Comparative Example 1 was followed except that the core (188.1 g) was made as described in Intermediate Example 5. The final latex had a solids content of 28.5%, a pH of 8.7, and a particle size of 403 nm. The dry density of this polymer was calculated to be 0.539 g/cc. Low RH S/Mil was 1.40, High RH S/Mil was 1.19, and % Collapse was 15.0%.

Example 6—Preparation of Aqueous Dispersion of Polymer Particles with Styrene in the Core and CHMA in Tie-Coat The procedure of Comparative Example 1 was carried out except that Intermediate Example 5 core (186.3 g) was use; and ME 1 monomers were styrene (60.0 g), MMA (38.4. g), MAA (9.6 g), and CHMA (12.0 g). The final latex had a solids content of 28.4%, a pH of 8.5, and a particle size of 405 nm. The dry density of this polymer was calculated to be 0.536 g/cc. Low RH S/Mil was 1.38, High RH S/Mil was 1.33, and % Collapse was 3.5%.

Example 7—Preparation of Aqueous Dispersion of Polymer Particles with t-Butyl Methacrylate in the Core and the Tie-Coat The procedure of Comparative Example 1 was carried out except that Intermediate Example 6 core (189.9 g) was used; and ME 1 monomers were styrene (60.0 g), MMA (38.4. g), MAA (9.6 g), and t-BuMA (12.0 g). The final latex had a solids content of 28.6%, a pH of 8.5, and a particle size of 437 nm. The dry density of this polymer was calculated to be 0.543 g/cc. Low RH S/Mil was 1.35, High RH S/Mil was 1.25, and % Collapse was 7.5%.

Example 8—Preparation of Aqueous Dispersion of Polymer Particles with t-Butyl Methacrylate in the Core and Cyclohexyl Methacrylate in the Tie-Coat The procedure of Comparative Example 1 was carried out except that Intermediate Example 6 core (189.9 g) was used; and ME 1 monomers were styrene (60.0 g), MMA (44.4. g), MAA (9.6 g), and CHMA (6.0 g). The final latex had a solids content of 28.6%, a pH of 8.4, and a particle size of 424 nm. The dry density of this polymer was calculated to be 0.531 g/cc. Low RH S/Mil was 1.40, High RH S/Mil was 1.31, and % Collapse was 6.5%.

Example 9—Preparation of Aqueous Dispersion of Polymer Particles with t-Butyl Methacrylate in the Core and Tie-Coat The procedure of Comparative Example 1 was carried out except that Intermediate Example 7 core (189.3 g) was used; and ME 1 monomers were styrene (60.0 g), MMA (38.4. g), MAA (9.6 g), and t-BMA (12.0 g). The final latex had a solids content of 28.8%, a pH of 8.5, and a particle size of 427 nm. The dry density of this polymer was calculated to be 0.569 g/cc. Low RH S/Mil was 1.29, High RH S/Mil was 1.22, and % Collapse was 5.5%.

Example 10—Preparation of Aqueous Dispersion of Polymer Particles with Isobornyl Methacrylate in the Core The procedure of Comparative Example 1 was carried out except that the core (186.3 g) was made as described in Intermediate Example 8. The final latex had a solids content of 28.5%, a pH of 8.8, and a particle size of 424 nm. The dry density of this polymer was calculated to be 0.540 g/cc. Low RH S/Mil was 1.31, High RH S/Mil was 1.21 and % Collapse was 7.5%.

Example 11—Preparation of Aqueous Dispersion of Polymer Particles with Isobornyl Methacrylate in the Tie-Coat The procedure of Comparative Example 1 was carried out except that Intermediate Example 1 core (188.7 g) was used; and ME 1 monomers were styrene (60.0 g), MMA (38.4. g), MAA (9.6 g), and IBOMA (12.0 g). The final latex had a solids content of 28.6%, a pH of 8.9, and a particle size of 413 nm. The dry density of this polymer was calculated to be 0.539 g/cc. Low RH S/Mil was 1.27, High RH S/Mil was 1.23, and % Collapse was 3.0%.

The data demonstrate that dispersions of multistage polymer particles having a dry bulk density of less than 0.55 g/cc can be prepared with a collapse resistance of less than 10%, which is considered acceptable in the field of opaque polymers.

The invention claimed is:

1. A composition comprising an aqueous dispersion of multistage polymer particles comprising a first and a second phase, wherein:
   a) the first phase comprises, based on the weight of the first phase, from 25 to 60 weight percent structural units of a carboxylic acid monomer or a salt thereof, from 40 to 75 weight percent structural units of a nonionic ethylenically unsaturated monomer, and up to a total of 15 weight percent structural units of styrene and a high $T_g$ hydrophobic monomer; and wherein
   b) the second phase comprises a mixture of first and second polymers, wherein
      1) the first polymer comprises, based on the weight of the first polymer, i) from 5 to 15 weight percent structural units of a carboxylic acid monomer or a salt thereof; ii) from 45 to 55 weight percent structural units of styrene; and iii) from 37 to 47 weight percent structural units of methyl methacrylate or the high $T_g$ hydrophobic monomer or a combination thereof; and
      2) the second polymer comprises, based on the weight of the second polymer, i) from 80 to 99.9 weight percent structural units of styrene; and ii) from 0.1 to 0.5 weight percent structural units of a multiethylenically unsaturated monomer;
   wherein the weight-to-weight ratio of the first phase to the second phase is in the range of from 1:9 to 1:20; and
   wherein the weight-to-weight ratio of the first polymer of the second phase to the second polymer of the second phase is in the range of from 1:3 to 1:8;
   with the proviso that the first phase and the first polymer of the second phase together comprise, based on the weight of the first phase and the first polymer of the second phase, from 2 to 15 weight percent structural units of the high $T_g$ hydrophobic monomer, which is one or more monomers selected from the group consisting of cyclohexyl methacrylate, isobornyl methacrylate, 4-t-butyl methacrylate, t-butylstyrene, and n-butyl methacrylate.

2. The composition of claim 1 wherein the weight-to-weight ratio of the first phase to the second phase is in the range of from 1:11 to 1:18; and wherein the weight-to-weight ratio of the first polymer of the second phase to the second polymer of the second phase is in the range of from 1:4 to 1:7.

3. The composition of claim 2 wherein
a) the first phase comprises, based on the weight of the first phase, from 25 to 50 weight percent of structural units of a salt of a carboxylic acid monomer, and from 40 to 70 weight percent structural units of a nonionic ethylenically unsaturated monomer; and from 5 to 10 weight percent structural units of the high $T_g$ hydrophobic monomer; wherein
b) the second phase first polymer comprises, based on the weight of the second phase first polymer, from 6 to 12 weight percent structural units of a salt of a carboxylic acid monomer; and wherein
c) the second phase second polymer comprises, based on the weight of the second phase second polymer, from 83 to 91 weight percent structural units of styrene; from 8 to 12 weight percent structural units of methyl methacrylate; from 0.5 to 4 weight percent structural units of an alkali metal salt of methacrylic acid of acrylic acid; and from 0.1 to 0.4 weight percent structural units of a multiethylenically unsaturated monomer.

4. The composition of claim 2 wherein
a) the first phase comprises, based on the weight of the first phase, from 30 to 50 weight percent of structural units of a salt of a carboxylic acid monomer, and from 50 to 70 weight percent structural units of a nonionic ethylenically unsaturated monomer; wherein
b) the second phase first polymer comprises, based on the weight of the second phase first polymer, from 6 to 12 weight percent structural units of a salt of a carboxylic acid monomer and from 5 to 15 weight percent structural units of the high $T_g$ hydrophobic monomer; and wherein
c) the second phase second polymer comprises, based on the weight of the second phase second polymer, from 83 to 91 weight percent structural units of styrene; from 8 to 12 weight percent structural units of methyl methacrylate; from 0.5 to 4 weight percent structural units of an alkali metal salt of methacrylic acid of acrylic acid; and from 0.1 to 0.4 weight percent structural units of a multiethylenically unsaturated monomer.

5. The composition of claim 2 wherein
a) the first phase comprises, based on the weight of the first phase, from 25 to 50 weight percent of structural units of a salt of a carboxylic acid monomer, and from 40 to 70 weight percent structural units of a nonionic ethylenically unsaturated monomer, and from 5 to 10 weight percent structural units of the high $T_g$ hydrophobic monomer; wherein
b) the second phase first polymer comprises, based on the weight of the second phase first polymer, from 6 to 12 weight percent structural units of a salt of a carboxylic acid monomer and from 5 to 15 weight percent structural units of the high $T_g$ hydrophobic monomer; wherein
c) the second phase second polymer comprises, based on the weight of the second phase second polymer, from 83 to 91 weight percent structural units of styrene; from 8 to 12 weight percent structural units of methyl methacrylate; from 0.5 to 4 weight percent structural units of an alkali metal salt of methacrylic acid of acrylic acid; and from 0.1 to 0.4 weight percent structural units of a multiethylenically unsaturated monomer.

6. The composition of claim 5 wherein
a) the second phase second polymer is a mixture of polymers comprising second phase second polymer A and second phase second polymer B, wherein
b) second phase second polymer A comprises, based on the weight of second phase second polymer A, from 78 to 86.5 weight percent structural units of styrene, from 12 to 18.5 weight percent structural units of methyl methacrylate, from 1 to 4 weight percent structural units of methacrylic acid or acrylic acid, and from 0.1 to 0.4 weight percent of a multiethylenically unsaturated monomer; wherein
c) second phase second polymer B comprises, based on the weight of second phase second polymer B, at least 98 weight percent structural units of styrene, and wherein
d) the weight-to-weight ratio of second phase second polymer A to second phase second polymer B is in the range of from 3:1 to 6:1.

7. The composition of claim 2 wherein the second phase comprises less than 1 weight percent structural units of acrylonitrile, methacrylonitrile, acrylamide, and methacrylamide, based on the weight of the second phase.

8. The composition of claim 7 wherein the second phase comprises less than 0.1 weight percent structural units of acrylonitrile, methacrylonitrile, acrylamide, and methacrylamide, based on the weight of the second phase.

9. The composition of claim 1 which further comprises a rheology modifier, a binder, $TiO_2$, and at least one additive selected from the groups consisting of surfactants, defoamers, biocides, dispersants, coalescents, and neutralizing agents.

* * * * *